(12) United States Patent
Ikeda et al.

(10) Patent No.: US 10,498,184 B2
(45) Date of Patent: Dec. 3, 2019

(54) INSULATED WIRE, COIL, AND ELECTRICAL OR ELECTRONIC EQUIPMENT

(71) Applicants: FURUKAWA ELECTRIC CO., LTD., Tokyo (JP); FURUKAWA MAGNET WIRE CO., LTD., Tokyo (JP)

(72) Inventors: Keisuke Ikeda, Tokyo (JP); Hideo Fukuda, Tokyo (JP); Takeshi Saito, Tokyo (JP)

(73) Assignees: FURUKAWA ELECTRIC CO., LTD., Tokyo (JP); FURUKAWA MAGNET WIRE CO., LTD., Tokyo (JP)

( * ) Notice: Subject to any disclaimer, the term of this patent is extended or adjusted under 35 U.S.C. 154(b) by 0 days.

(21) Appl. No.: 16/117,678

(22) Filed: Aug. 30, 2018

(65) Prior Publication Data

US 2018/0375396 A1    Dec. 27, 2018

Related U.S. Application Data

(63) Continuation of application No. PCT/JP2017/008162, filed on Mar. 1, 2017.

(30) Foreign Application Priority Data

Mar. 3, 2016 (JP) .................. 2016-040748

(51) Int. Cl.
*H01B 7/00* (2006.01)
*H02K 3/34* (2006.01)
(Continued)

(52) U.S. Cl.
CPC ............ *H02K 3/34* (2013.01); *H01B 7/0009* (2013.01); *H01B 7/02* (2013.01); *H01B 7/0225* (2013.01); *H01B 13/0016* (2013.01); *H01B 13/065* (2013.01); *H01F 5/00* (2013.01); *H01F 5/06* (2013.01); *H02K 3/12* (2013.01); *H02K 3/30* (2013.01); *H02K 3/32* (2013.01); *H02K 15/105* (2013.01)

(58) Field of Classification Search
USPC ........ 174/110 R, 110 SC, 120 R, 120 SC, 36
See application file for complete search history.

(56) References Cited

U.S. PATENT DOCUMENTS

2015/0021067 A1    1/2015    Muto et al.
2015/0262732 A1    9/2015    Oya et al.
(Continued)

FOREIGN PATENT DOCUMENTS

JP    2007-166731 A    6/2007
JP    2010-56049 A    3/2010
(Continued)

OTHER PUBLICATIONS

International Search Report, issued in PCT/JP2017/008162, dated Apr. 11, 2017.
(Continued)

*Primary Examiner* — William H. Mayo, III
(74) *Attorney, Agent, or Firm* — Birch, Stewart, Kolasch & Birch, LLP

(57) ABSTRACT

An insulated wire, having: an insulating layer on the outer periphery of a conductor having a rectangular cross-section; an adhesive layer on the outer periphery of the insulating layer; and an insulating paper on the outer periphery of the adhesive layer, wherein the adhesive layer has a thickness of 2 to 50 μm, and wherein a resin constituting the adhesive layer does not have a melting point and has a tensile modulus at 250° C. of $0.9 \times 10^7$ to $1.2 \times 10^8$ Pa; a coil, comprised of this insulated wire; and an electrical or electronic equipment.

5 Claims, 3 Drawing Sheets

(51) Int. Cl.
  *H01F 5/00*     (2006.01)
  *H01F 5/06*     (2006.01)
  *H01B 7/02*     (2006.01)
  *H02K 3/32*     (2006.01)
  *H01B 13/00*    (2006.01)
  *H01B 13/06*    (2006.01)
  *H02K 3/12*     (2006.01)
  *H02K 3/30*     (2006.01)
  *H02K 15/10*    (2006.01)

(56)  References Cited

U.S. PATENT DOCUMENTS

2016/0307663 A1    10/2016  Ikeda et al.
  2016/0307667 A1*   10/2016  Fukuda .................. B60L 50/10
  2017/0084361 A1     3/2017  Oya et al.

FOREIGN PATENT DOCUMENTS

JP     2010-126684 A     6/2010
  JP     2012-182910 A     9/2012
  JP      2015-35866 A     2/2015
  WO   WO 2015/098638 A1   7/2015
  WO   WO 2015-186730 A1  12/2015

OTHER PUBLICATIONS

European Search Report mailed in corresponding European Application No. 17760089.7 dated Sep. 23, 2019.
Japanese Office Action mailed in correspond Japanese Application No. 2016-40748 dated Oct. 8, 2019.

* cited by examiner

INSULATED WIRE, COIL, AND ELECTRICAL OR ELECTRONIC EQUIPMENT

CROSS-REFERENCE TO RELATED APPLICATIONS

This application is a Continuation of PCT International Application No. PCT/JP2017/008162 filed on Mar. 1, 2017, which claims priority under 35 U.S.C. § 119 (a) to Japanese Patent Application No. 2016-040748 filed in Japan on Mar. 3, 2016. Each of the above applications is hereby expressly incorporated by reference, in its entirety, into the present application.

TECHNICAL FIELD

The present invention relates to an insulated wire, a coil, and an electrical or electronic equipment.

BACKGROUND ART

In coils for the electrical or electronic equipment, including inverter-related equipment, such as high-speed switching devices, inverter motors, transformers, and the like, there are used, as a magnet wire, insulated electric wires (insulated wires) composed of a so-called enamel wire, insulated wires having multi-covering layers including a layer composed of an enamel resin and a covering layer composed of another kind of resin other than the enamel resin, and the like.

In regard to coils for the electrical or electronic equipment, various techniques have been developed in order to immobilize the insulated wire (winding wire) or to enhance the insulation property. For example, Patent Literature 1 discloses a technique of disposing an insulating paper at coil housing grooves formed at a stator core of a rotating electric motor, immobilizing the coil at the coil housing groove using a varnish, and thereby immobilizing the coil while providing insulation between the coil and the stator core. Patent Literature 2 discloses a prepreg sheet as a technique for preventing a contact between a stator core or a rotor core of a driving motor for a vehicle and a conductor coil.

Furthermore, an investigation has also been conducted to enhance the insulation property at a bent portion of an insulated wire. For example, Patent Literature 3 discloses a technique for preventing partial discharge in between adjacent coils or the like, by providing an additional insulating layer in predetermined regions of hypotenuse parts and bent parts of a segment coil.

CITATION LIST

Patent Literatures

Patent Literature 1: JP-A-2007-166731
Patent Literature 2: JP-A-2010-126684
Patent Literature 3: JP-A-2015-035866

SUMMARY OF INVENTION

Technical Problem

In the technique described in Patent Literature 1, there may be slippage of insulating papers caused by an operation of inserting an insulated wire, or the like. When slippage occurs toward the vertical direction of the slot (direction of motor axis) or the outer side of the slot (inner side of the motor radius direction), this slippage leads to inconveniences, such as interference with the rotor, or the like. Furthermore, since the prepreg sheet described in Patent Literature 2 is such that a thermosetting adhesive layer formed on a sheet base material is formed from an epoxy-based resin composition, when the prepreg sheet is used in a high-temperature environment (for example, 200° C. or higher), the thermosetting adhesive layer is softened, and there is a problem that the thermosetting adhesive layer loses adhesiveness. Furthermore, in regard to an insulated wire, the performance required at a part that is inserted into a slot (linear part) and the performance required at a part on the outside of the slot (bent portion or welded portion) are different. In the case where an additional insulating layer is provided as described in Patent Literature 3 in order to obtain a high partial discharge initiation voltage at a bent portion, it is necessary to determine the position after bending of the winding wire and form the additional insulating layer, and therefore, the production process becomes complicated.

A subject of the present invention is to provide an insulated wire having an insulating paper, with an adhesive layer being interposed therebetween, the insulated wire being not likely to have slippage of the insulating paper at the time of inserting the insulated wire into a slot of a stator core or at the time of bending, and the bent portion exhibiting a high partial discharge initiation voltage (PDIV) and excellent heat resistance; a coil using the insulated wire; and an electrical or electronic equipment using the coil.

Solution to Problem

The inventors of the present invention have found that an insulated wire in which an insulating layer is provided on the outer periphery of a conductor having a rectangular cross-section, an adhesive layer is provided on the outer periphery of the insulating layer, the adhesive layer having a particular thickness and having a tensile modulus at 250° C. in a particular range, while the resin constituting the adhesive layer does not have a melting point, and an insulating paper is provided on the outer periphery of the adhesive layer, is such that even under a high temperature (for example, 200° C.), the insulating paper can be fixed to the insulating layer with strong fixing strength, slippage of the insulating paper does not easily occur when the insulated wire is inserted into a slot of a stator core or is subjected to bending, and that the insulated wire has a high PDIV at a bent portion even without an additional insulating layer separately provided on the bent portion and has excellent heat resistance. The present invention is based on these findings, and the inventors of the present invention further conducted investigation, thus completing the present invention.

That is, the problems of the present invention were solved by the following means:

[1] An insulated wire, having: an insulating layer on the outer periphery of a conductor having a rectangular cross-section; an adhesive layer on the outer periphery of the insulating layer; and an insulating paper on the outer periphery of the adhesive layer,
wherein the adhesive layer has a thickness of 2 to 50 μm, and wherein a resin constituting the adhesive layer does not have a melting point and has a tensile modulus at 250° C. of $0.9 \times 10^7$ to $1.2 \times 10^8$ Pa.

[2] The insulated wire described in the item [1], wherein the adhesive layer contains, as the resin constituting the adhesive layer, at least one resin selected from the group consisting of polyethersulfone, polyphenylsulfone, and polyetherimide.

[3] The insulated wire described in the item [1] or [2], further having an adhesive layer on the outer periphery of the insulating paper.

[4] A coil, comprising the insulated wire described in any one of the items [1] to [3].

[5] An electrical or electronic equipment, having the coil described in the item [4].

In the description of the present invention, any numerical expressions in a style of " . . . to . . . " will be used to indicate a range including the lower and upper limits represented by the numerals given before and after "to", respectively.

Effects of Invention

In the insulated wire of the present invention, the insulating paper is fixed to the insulating layer with strong fixing strength, and when the insulated wire is inserted into a slot of a stator core, slippage of the insulating paper does not occur. Furthermore, the insulated wire has a high partial discharge initiation voltage (PDIV) at a bent portion even without an additional insulating layer at the bent portion, and has excellent bending workability and excellent heat resistance. Furthermore, a coil using the insulated wire of the present invention and an electrical or electronic equipment using the coil have excellent insulation property.

Other and further features and advantages of the invention will appear more fully from the following description, appropriately referring to the accompanying drawings.

MODE FOR CARRYING OUT THE INVENTION

[Insulated Wire]

Figure 1:
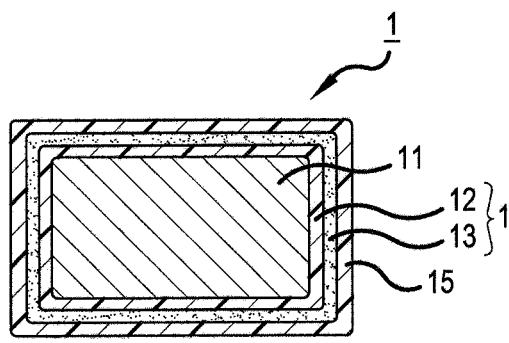
FIG. 1 is a schematic cross-sectional view showing a preferred embodiment of the insulated wire of the present invention.

The insulated wire of the present invention has an insulating layer on the outer periphery of a conductor having a rectangular cross-section, has an adhesive layer on the outer periphery of this insulating layer, and further has an insulating paper on the outer periphery of this adhesive layer. The insulated wire of the present invention may have an adhesive layer on the outer periphery of this insulating paper. The compositions of the conductor and the various layers that constitute the insulated wire of the present invention will be described below.

Hereinafter, preferable embodiments of the insulated wire of the present invention are described with reference to the drawings. However, the present invention is not limited to the following embodiments, except for the matters stipulated in the present invention. Further, the form shown in each drawing is a schematic view for making comprehension of the present invention easy. Therefore, the size, the thickness, or the relative magnitude relationship, and the like, of each member may be appropriately subjected to variation for the purpose of illustration. Accordingly, the drawing does not show a real relationship as it is. Further, those other than the matters stipulated in the present invention are not limited to the external form and the shape, as shown in these drawings.

A preferable insulated wire 1 of the present invention, whose cross-sectional view is shown in FIG. 1, has a conductor 11, a resin covering layer 14 formed on the outer periphery of the conductor 11, and an insulating paper 15. As to the conductor 11, its cross-sectional shape is rectangular (flat angular shape). In the present invention, the conductor having a rectangular cross-section includes a conductor having an oblong cross-section and a conductor having a square cross-section.

The resin covering layer 14 has double-layered structure composed of: an insulated layer 12 as an innermost resin layer in contact with the outer periphery of the conductor 11; and an adhesive layer 13 in contact with the outer periphery of the insulated layer 12. A total thickness of the resin covering layer 14 is preferably set to a range of 40 to 250 μm.

In the present specification, the thickness of the resin covering layer or each of the layers which constitute the resin covering layer, is a value calculated as an average from the values of measurement in accordance with the following measuring method of: observing the cross-section of the insulated wire cut at right angle with respect to the longitudinal direction thereof by using a microscope; then arbitrarily selecting 16 points of the shortest distance of from the outer periphery of the inner layer in contact with the resin layer of the measuring object (a conductor in the case where the layer of the measuring object is in contact with the conductor) to the outer periphery of the layer of the measuring object; and then measuring the distances at the arbitrarily selected 16 points.

Figure 2:
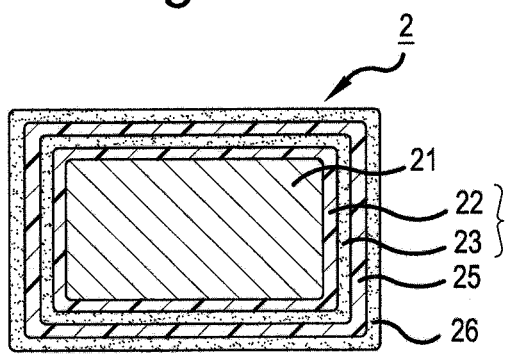
FIG. 2 is a schematic cross-sectional view showing another preferred embodiment of the insulated wire of the present invention.

A preferable insulated wire 2 of the present invention, whose cross-sectional view is shown in FIG. 2, has the same constitution as the insulated wire 1, except for having an adhesive layer 26 provided with on the outer periphery of an insulating paper 25.

Figure 3:
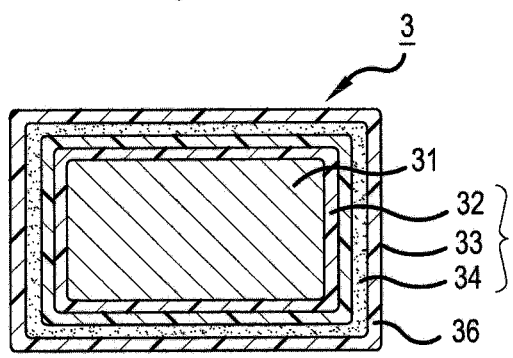
FIG. 3 is a schematic cross-sectional view showing further another preferred embodiment of the insulated wire of the present invention.

A preferable insulated wire 3 of the present invention, whose cross-sectional view is shown in FIG. 3, has the same constitution as the insulated wire 1, except for having an insulated layer 33 interposed between an insulated layer 32 and an adhesive layer 34.

Figure 4:
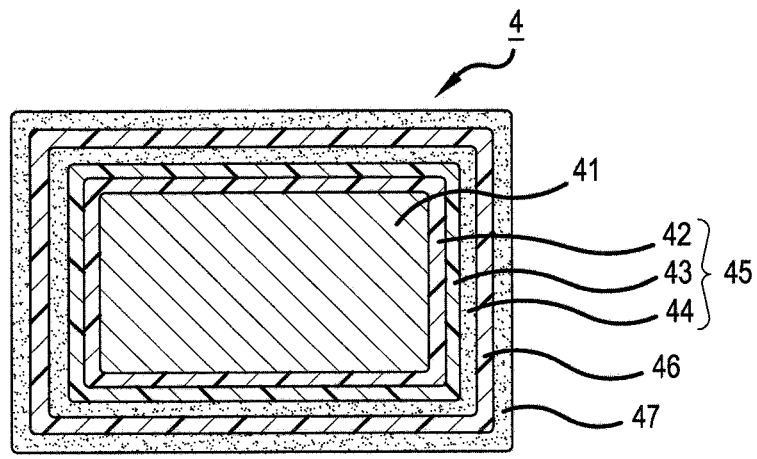
FIG. 4 is a schematic cross-sectional view showing still another preferred embodiment of the insulated wire of the present invention.

A preferable insulated wire 4 of the present invention, whose cross-sectional view is shown in FIG. 4, has the same constitution as the insulated wire 3, except for having an adhesive layer 47 provided with on the outer periphery of an insulating paper 46.

In the following description, the conductor, insulating layer, adhesive layer, and insulating paper to be used in the insulated wire of the present invention will be explained with reference to FIG. 1 and FIG. 2.

<Conductors 11, 21>

As the conductor 11 or 12 to be used in the present invention, use may be broadly made of any usual one that is used in insulated wires, and examples thereof include, which may be used of any metal conductor, such as a copper wire and an aluminum wire. The conductor is preferably a low-oxygen copper whose oxygen content is 30 ppm or less, and furthermore preferably a low-oxygen copper whose oxygen content is 20 ppm or less or oxygen-free copper. In the case where the conductor is melted by heat for the purpose of welding if the oxygen content is 30 ppm or less, voids which may be caused by contained oxygen are not occurred at a welded portion, the deterioration of the electrical resistance of the welded portion can be prevented, and the mechanical strength of the welded portion can be also secured.

As to the conductor 11 or 12 to be used in the present invention, its cross-sectional shape is rectangular (flat angular shape). The rectangular conductor is able to increase a space factor with respect to the slot of the stator core at the winding, when compared to a circular conductor.

In view of suppressing partial discharge from a corner portion, the rectangular conductor has preferably such a shape that chamfered edges (curvature radius r) are provided at four corners, as shown in FIG. 1 or FIG. 2. The curvature radius r is preferably 0.6 mm or less, and more preferably in a range from 0.2 to 0.4 mm.

The size of the conductor is not particularly limited. In the case of the rectangular conductor, in the rectangular cross-sectional shape, the width (long side) thereof is preferably from 1.0 to 5.0 mm, and more preferably from 1.4 to 4.0 mm, and the thickness (short side) is preferably from 0.4 to 3.0 mm, and more preferably from 0.5 to 2.5 mm. The ratio of length (thickness : width) of the width (long side) and the thickness (short side) is preferably from 1:1 to 1:4. To the contrary, in the case of a conductor whose cross-sectional shape is round, the size is preferably 0.3 to 3.0 mm, and more preferably 0.4 to 2.7 mm in terms of a diameter. Note that, when the ratio of the length of the width (longer side) and the length of the thickness (shorter side) (thickness : width) is 1:1, the longer side means one of a pair of sides facing each other, while the shorter side means one of another pair of sides facing each other.

<Insulating Layers 12, 22>

In regard to the insulated wire of the present invention, it is preferable that the insulating layers 12 and 22 are both a layer formed from a thermosetting resin (hereinafter, referred to as thermosetting resin layer).

According to the present invention, in the case where the phrase "layer formed from resin (resin Z)" is used, the phrase will be used to mean to include both an embodiment of a layer formed from resin Z only, and an embodiment of a layer formed from resin Z and another component (for example, a resin other than the resin Z or an additive). Here, the percentage content of the "other component" in the layer formed from resin Z is not particularly limited as long as the intended effects are not impaired, and the percentage content is ordinarily larger than 0% by mass and 10% by mass or less (preferably, 5% by mass or less).

The thermosetting resin layer according to the present invention means a resin layer in a cured state, but does not mean a resin layer before being cured.

In regard to the insulated wire of the present invention, it is preferable that the insulating layers 12 and 22 each are a resin layer obtained by bake-coating a varnish of a thermosetting resin and subjecting the varnish to a curing reaction.

The insulating layer 12 or 22 is preferably a so-called enamel (resin) layer.

The thermosetting resin to be used in the insulating layer 12 or 22 is not particularly limited, and examples thereof include polyimide (PI), polyurethane, polyamideimide (PAI), polyester (PEst), polybenzimidazole, polyesterimide (PEsI), a melamine resin, and an epoxy resin. Among these, at least one kind selected from the group consisting of polyimide, polyamideimide, polyester, and polyesterimide is preferred, and at least one kind selected from the group consisting of polyimide, polyamideimide, and polyester is more preferred.

In the insulating layer 12 or 22, one kind of the thermosetting resin may be used alone, or alternatively two or more kinds thereof may be used in combination.

The polyimide capable of constituting the insulating layer 12 or 22 is not particularly limited, and use can be made of ordinarily polyimide, such as a whole aromatic polyimide and a thermosetting aromatic polyimide. Alternatively, use may be made of polyimides obtained, in a usual manner, in which an aromatic tetracarboxylic dianhydride and an aromatic diamine compound are reacted in a polar solvent, to obtain a polyamide acid solution, and then the thus-obtained polyamide acid solution is subjected to imidization by a thermal treatment at the time of baking.

The polyamideimide capable of constituting the insulating layer 12 or 22, when compared to other resins, has a lower thermal conductivity and a higher dielectric breakdown voltage, and a bake-setting can be conducted. The polyamideimide is not particularly limited. Examples thereof include polyamideimides obtained, in a usual manner, for example, a method in which a tricarboxylic anhydride and a diisocyanate compound are directly reacted in a polar solvent, or a method in which a diamine compound is reacted with a tricarboxylic anhydride in a polar solvent to previously introduce an imide bond to the reaction product, and then the reaction product is subjected to amidation using a diisocyanate compound.

The polyester which may constitute the insulating layer 12 or 22 is not particularly limited, as long as it is a polymer having an ester bond in the molecule and a thermosetting property. The polyester is preferably a Class H polyester (HPE). Examples of the Class H polyester include an aromatic polyester resin having been modified by adding thereto a phenol resin or the like, and also having Class H heat resistance.

Further, the polyesterimide capable of constituting the insulating layer 12 or 22 is not particularly limited, as long as it is a polymer having an ester bond and an imide bond in the molecule and a thermosetting property. For example, use may be made of: one, obtained by forming the imide bond from a tricarboxylic anhydride and an amine compound, forming the ester bond from alcohol and a carboxylic acid or an alkyl ester thereof, and then joining of a free acid group or an anhydride group of the imide bond in an ester-forming reaction. As such a polyesterimide, use may be also made of: one, obtained by allowing, for example, a tricarboxylic anhydride, a dicarboxylic acid compound or an alkyl ester thereof to react with an alcohol compound and a diamine compound in a usual manner.

The thickness of the insulating layer 12 or 22 is not particularly limited. For example, it is ordinarily 20 to 120 μm, more preferably 40 to 100 μm.

The insulating layer 12 or 22 is ordinarily formed by bake-coating on the surface of the conductor 11 or 21. Specifically, the insulating layer 12 or 22 is preferably formed by bake-coating of a varnish, which contains a thermosetting resin, on the surface of the conductor 11 or 21.

As a thermosetting resin to be used in the insulating layer 12 or 22, any of commercial products may be used. Examples of the polyimide include U IMIDE (trade name, manufactured by Unitika Ltd.), U-VARNISH (trade name, manufactured by Ube Industries, Ltd.), and the like.

Examples of the polyamideimide include HI406 and HCI-series (each trade name, manufactured by Hitachi Chemical Co., Ltd.) and the like. Examples of the Class H polyesters include Isone1200 (trade name, manufactured by Schenectady International Inc.), Neoheat 8242K2 (trade name, manufactured by Toutoku Toryo Co., Ltd.), and the like. Examples of the polyesterimide include Neoheat 8600A (trade name, manufactured by Toutoku Toryo Co., Ltd.), and the like. The insulating layers 12 and 22 may be in the form in which air bubbles exist within the layer.

<Adhesion Layers 13, 23>

The adhesive layers 13 and 23 can be fixed to the insulating papers that are in contact with the adhesive layers 13 and 23, and as a result, the insulated wire can be immobilized to the insulating papers. In order to fix these adhesive layers 13 and 23 to the insulating papers, in a usual manner, the adhesive layers 13 and 23 are subjected to a heating treatment at a temperature of 250° C. or higher while in a state of being in contact with the insulating papers. The heating treatment temperature for fixing is preferably adjusted to 250° C. to 320° C., and more preferably to 270° C. to 300° C. Furthermore, the heating treatment time for fixing is preferably set to 5 to 20 minutes, and more preferably 10 to 15 minutes.

The adhesive layers 13 and 23 each are formed from a thermoplastic resin having particular physical properties. That is, the thermoplastic resin that constitutes the adhesive layers 13 and 23 does not have a melting point. Since the thermoplastic resin that constitutes the adhesive layers does not have a melting point, even if the adhesive layers are repeatedly exposed to high temperature or exposed to high temperature for a long time period, the adhesive layers do not easily become hard, and the state of being strongly fixed to an object can be persistently maintained stable for a long time period. The phrase "does not have a melting point" according to the present invention means that a crystal melting peak or a crystallization peak is not observed in a differential scanning calorimetric (DSC) analysis.

Furthermore, the thermoplastic resin that constitutes the adhesive layers 13 and 23 has a tensile modulus at 250° C. of $0.9 \times 10^7$ to $1.2 \times 10^8$ Pa, and preferably $0.9 \times 10^7$ to $1.0 \times 10^8$ Pa. By having such a tensile modulus, the thermoplastic resin can exhibit strong fixing strength even in a severe environment at higher temperature. According to the present invention, the "tensile modulus at 250° C." can be measured by the method described in the section for Examples given below.

The thermoplastic resin that constitutes the adhesive layers 13 and 23 is not particularly limited as long as the thermoplastic resin has the physical properties described above, and for example, use can be made of at least one resin selected from polyethersulfone (PES), polyetherimide (PEI), polyphenylene sulfide (PPS), polyethersulfone (PESU), polyphenylsulfone (PPSU), polyetherimide (PEI), and polysulfone (PSU). It is also preferable to use a resin blend of any two or more of these resins.

Above all, it is preferable that the thermoplastic resin that constitutes the adhesive layers 13 and 23 includes at least one thermoplastic resin selected from any of polyethersulfone, polyphenylsulfone, and polyetherimide. In this case, the content of any of polyethersulfone, polyphenylsulfone, and polyetherimide among the thermoplastic resins that constitute the adhesive layers 13 and 23 is preferably 50% by mass or more, more preferably 70% by mass or more, even more preferably 80% by mass or more, and particularly preferably 90% by mass or more, as a total content. Even more preferably, the thermoplastic resin that constitutes the adhesive layers 13 and 23 is composed of at least one thermoplastic resin selected from any of polyethersulfone, polyphenylsulfone, and polyetherimide.

The thickness of the adhesive layers 13 and 23 is not particularly limited, and from the viewpoint of achieving both sufficient fixing strength and high density (space factor) of the coil, the thickness is generally 2 to 50 μm, and preferably 5 to 20 μm.

<Insulated Papers 15, 25>

The insulating papers 15 and 25 are required to accomplish a role equivalent to that of the insulating paper to be used in a process for forming a coil by winding a winding wire produced from a round wire or a rectangular wire around, for example, a stator coil that constitutes a motor for driving a hybrid vehicle. Therefore, it is required that the insulating papers have excellent impregnability of varnish and excellent heat resistance. For example, the insulating paper is constructed from a film; and a nonwoven fabric provided on both surfaces of the film. For example, by selecting aramid fibers having excellent heat resistance as the nonwoven fabric, an insulating paper having high heat resistance is obtained. The insulating papers 15 and 25 are formed as layers of insulating paper, by winding an insulating paper having a predetermined width on the outer periphery several times when an insulated wire having an insulating layer and an adhesive layer formed on a conductor is used for wiring. The thickness of the layer of the insulating paper is generally 10 to 600 μm, and preferably about 20 to 300 μm.

The insulating papers 15 and 25 that constitute the insulated wire of the present invention may be composed of one layer of the insulating paper. Furthermore, the insulating paper may be wound several times as described above so as to be produced into a form having two or more layers.

<Adhesion Layer 26>

The adhesive layer 26 may be the same as or different from the adhesive layer 23; however, it is preferable that the adhesive layer 26 is different from the adhesive layer 23.

The adhesive layer 26 can be fixed to an object that is in contact with the adhesive layer 26, and as a result, the insulated wire can be reliably immobilized by the object. In order to fix this adhesive layer 26 to an object, in a usual manner, the adhesive layer 26 is subjected to a heating treatment at a temperature of 250° C. or higher, while in a state of being in contact with the object. The heating treatment temperature for fixing is preferably adjusted to 250° C. to 320° C., and more preferably to 270° C. to 300° C. Furthermore, the heating treatment time for fixing is preferably set to 5 to 20 minutes, and more preferably to 10 to 15 minutes.

The thermoplastic resin that constitutes the adhesive layer 26 is not particularly limited. Examples of the resin that constitutes the adhesive layer 26 include resins overlapping with the resins listed for the adhesive layer 24, and for example, use can be made of at least one resin selected from a polyester elastomer, polyetherimide (PEI), a polyamide elastomer, polyphenylsulfone (PPSU), polyphenylene ether (PPE), polyphenylene sulfide (PPS), polyethylene terephthalate (PET), and polysulfone (PSU). It is also preferable to use a resin blend of any two or more of these resins. It is preferable that the thermoplastic resin that constitutes the adhesive layer 26 has a tensile modulus at 250° C. of $0.9 \times 10^7$ to $1.2 \times 10^8$ Pa, and more preferably $0.9 \times 10^7$ to $1.2 \times 10^8$ Pa.

In this case, the content of any of a polyester elastomer, polyetherimide, a polyamide elastomer, polyphenylsulfone, polyphenylene ether, polyphenylene sulfide, and polysulfone, among any of the thermoplastic resins that constitute the adhesive layer 26, is preferably 50% by mass or more, more preferably 70% by mass or more, even more preferably 80% by mass or more, and particularly preferably 90% by mass or more, as a total content.

The thickness of the adhesive layer 26 is not particularly limited, and from the viewpoint of achieving both sufficient fixing strength and high density (space factor) of the coil, the thickness is preferably 1 to 100 μm, and more preferably 2 to 50 μm.

According to the present invention, the insulated wire having the configuration illustrated in FIG. 1 may have an insulating layer formed from a thermoplastic resin between the insulating layer 12 and the adhesive layer 13, and thus may have the configuration illustrated in FIG. 3. Furthermore, the insulated wire having the configuration illustrated in FIG. 2 may have an insulating layer formed from a thermoplastic resin between the insulating layer 22 and the adhesive layer 23, and thus may have the configuration illustrated in FIG. 4. The thickness of any of these insulating layers (insulating layer 33 in FIG. 3, and insulating layer 43 in FIG. 4) is not particularly limited; however, the thickness is preferably 60 to 250 μm, and more preferably 50 to 200 μm. The conductors 31 and 41 in FIG. 3 and FIG. 4 have the same meanings as in the conductors 11 and 21. Furthermore, the insulating layers 32 and 42 have the same meanings as in the insulating layers 12 and 22. The adhesive layers 34 and 44 have the same meanings as in the adhesive layers 13 and 23. The insulating papers 36 and 46 have the same meanings as in the insulating papers 15 and 25. The adhesive layer 47 has the same meaning as in the adhesive layer 26.

The thermoplastic resin that constitutes any of the insulating layers 33 and 43 is not particularly limited. Examples of the thermoplastic resin that constitutes any of the insulating layers 33 and 43 include polyether ether ketone (PEEK), thermoplastic polyimide (TPI), polyphenylene sulfide (PPS), polyethylene terephthalate (PET), and polybutylene terephthalate (PBT). Preferably, use is made of at least one resin selected from polyether ether ketone (PEEK), polyphenylene sulfide (PPS), and polyethylene terephthalate (PET).

[Method of Producing Insulated Wire]

The insulated wire of the present invention is produced by forming a resin covering layer which includes at least the insulated layer and the adhesion layer, to cover the outer periphery of the conductor, to cover with the insulating paper, on the outer periphery of the resin covering layer.

In more detail, the insulated wire can be produced, by sequentially or simultaneously forming the insulated layer 12 and the adhesion layer 13 on the outer periphery of the conductor 11. In forming each layer, as an embodiment, each layer may be formed sequentially in the order from the side close to the outer periphery of the conductor, or alternatively a part or all of the layers may be formed at the same time. Further, in forming each layer, it can be also adopted, a method of preparing a resin-containing varnish and forming a layer by using this varnish, and then drying. The method for forming the insulating paper 15 is not particularly limited; however, the insulating paper 15 can be formed, after the insulating layer 12 and the adhesive layer 13 are formed, as layers of the insulating paper 15 by winding a plurality of layers of the insulating paper into a helical form, around the direction of wiring as the axis, using a paper rolling facility while implementing wiring. Furthermore, an insulated wire having the configuration illustrated in FIG. 2 can be produced, by further forming an adhesive layer 26 by, for example, employing a method of producing a varnish containing a thermoplastic resin that constitutes the adhesive layer 26, forming a layer using this varnish on the outer periphery of an insulating paper 15 of an insulated wire having the layer configuration illustrated in FIG. 1, and then drying the varnish.

Incidentally, an insulated wire having the configuration illustrated in FIG. 3 can be produced, by further forming an insulating layer 33 on the outer peripheral surface of the insulting layer 32, similarly to the case of the insulating layer 12, in the production of an insulated wire having the configuration illustrated in FIG. 1. Furthermore, an insulated wire having the configuration illustrated in FIG. 4 can be produced, by further forming an adhesive layer 47 on the outer peripheral surface of the insulating paper 46, similarly to the case of the adhesive layer 26, in the production of an insulated wire having the configuration illustrated in FIG. 3.

Furthermore, it is also preferable that the various resin layers that constitute the resin covering layers and the adhesive layers covering the insulating paper are sequentially bake-coated. In the case of forming the resin layer by baking, a varnish containing a resin which constitutes an objective resin layer is prepared and then the resin layer is formed by coating and baking the varnish. A conventional method may be applied to the method of coating the varnish without any particular limitation. Examples thereof include: a method of using a die for coating the varnish, whose shape is similar to a cross-sectional shape of the conductor; and in the case where the cross-sectional shape of the conductor is rectangular, a method of using a die which is referred to as a "universal die" formed in the curb-like form. The varnish can also be spray-coated.

The baking after a varnish coating can be performed in a usual manner. For example, the baking can be conducted in a baking furnace. A specific baking condition in this case depends on the shape of the furnace to be used and therefore is not unambiguously determined. In a case of about 8-m natural convection vertical furnace, the examples of the condition include those of 10 to 90 sec transit time at 400 to 650° C. of in-furnace temperature.

To the above-described varnish, any of various kinds of additives may be added in a degree which does not adversely affect the properties of each layer. These additives are not particularly limited. Examples thereof include a cell nucleating agent, an oxidation inhibitor, an antistatic agent, an anti-ultraviolet agent, a light stabilizer, a fluorescent brightening agent, a pigment, a dye, a compatibilizing agent, a lubricating agent, a reinforcing agent, a flame retardant, a crosslinking agent, a crosslinking aid, a plasticizer, a thickening agent, a thinning agent, and an elastomer.

It is preferred that the varnish contains an organic solvent or the like in the making of a varnish of a thermoplastic resin or a thermosetting resin. Examples of such an organic solvent include: amide-based solvents, such as N-methyl-2-pyrrolidone (NMP), N,N-dimethylacetamide (DMAC), and N,N-dimethylformamide (DMF); urea-based solvents, such as N,N-dimethylethyleneurea, N,N-dimethylpropyleneurea, and tetramethylurea; lactone-based solvents, such as γ-butyrolactone and γ-caprolactone; carbonate-based solvents, such as propylene carbonate; ketone-based solvents, such as methyl ethyl ketone, methyl isobutyl ketone, and cyclohexanone; ester-based solvents, such as ethyl acetate, n-butyl acetate, butyl cellosolve acetate, butyl carbitol acetate, ethyl cellosolve acetate, and ethyl carbitol acetate; glyme-based solvents, such as diglyme, triglyme, and tetraglyme; hydrocarbon-based solvents, such as toluene, xylene, and cyclohexane; phenol-based solvents, such as cresol, phenol, and halogenated phenol; sulfone-based solvents, such as sulfolane; and dimethylsulfoxide (DMSO).

As the organic solvent or the like, only one kind may be used alone, or two or more kinds may be used in combination.

[Coil, and Electrical or Electronic Equipment]

The insulated wire of the present invention is applicable to a field which requires electrical properties (resistance to voltage) and heat resistance, such as various kinds of electrical or electronic equipment, as coil. For example, the insulated wire of the present invention is used for a motor, a transformer, and the like, which can compose high-performance electrical or electronic equipment. In particular, the insulated wire is preferably used as a winding wire for a driving motor of HV and EV. As descried above, according to the present invention, it is possible to provide an electrical or electronic equipment, in particular a driving motor of hybrid vehicle (HV) and electrical vehicle (EV), using the insulated wire of the present invention, as coil.

The coil of the present invention is not particularly limited, as long as it has a form suitable for any of various kinds of electrical or electronic equipment, and examples thereof include: items formed by a coil processing of the insulated wire of the present invention, and items formed by making an electrical connection of prescribed parts after subjecting the insulated wire of the present invention to a bending processing.

The coils formed by coil processing of the insulated wire of the present invention, are not particularly limited, and examples thereof include a roll formed by spirally winding around a long insulated wire. In these coils, the number of winding wires or the like of the insulated wire is not particularly limited. Ordinarily, in winding around the insulated wire, use may be made of an iron core, or the like.

Example of the items formed by making an electrical connection of prescribed parts after subjecting the insulated wire of the present invention to a bending processing include: coils to be used in a stator for rotating electrical machines or the like. Examples of these coils include: a coil 53 (see FIG. 5) prepared, by cutting the insulated wire of the present invention having the constitution as shown in any of FIGS. 1 to 4 in a prescribed length, and then subjecting it to a bending processing in the U-shaped form or the like, thereby preparing a plurality of wire segments 54, and then alternately connecting two open ends (terminals) 54a in the U-shaped form or the like of each wire segment 54, as shown in FIG. 6. In the case where an insulated wire having the configuration illustrated in FIG. 2 or FIG. 4 is used, the adhesive layer on the outer periphery of the insulating paper and the slot 52 can be fixed by, for example, heating the coil 53 to a temperature of 250° C. or higher, and thus the coil is immobilized.

Figure 5:
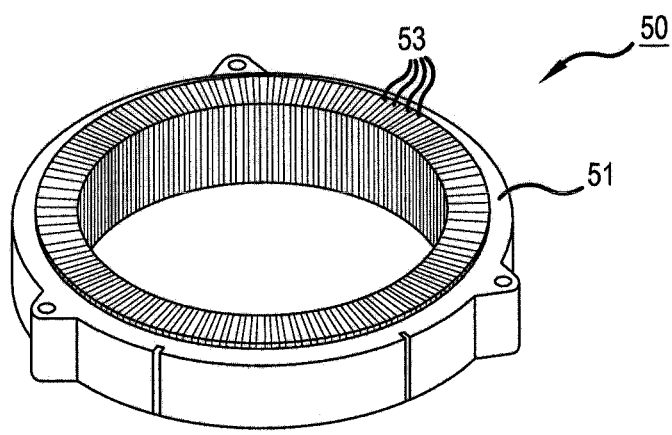
FIG. 5 is a schematic perspective view showing a preferable embodiment of the stator to be used in the electrical or electronic equipment of the present invention.
Figure 6:
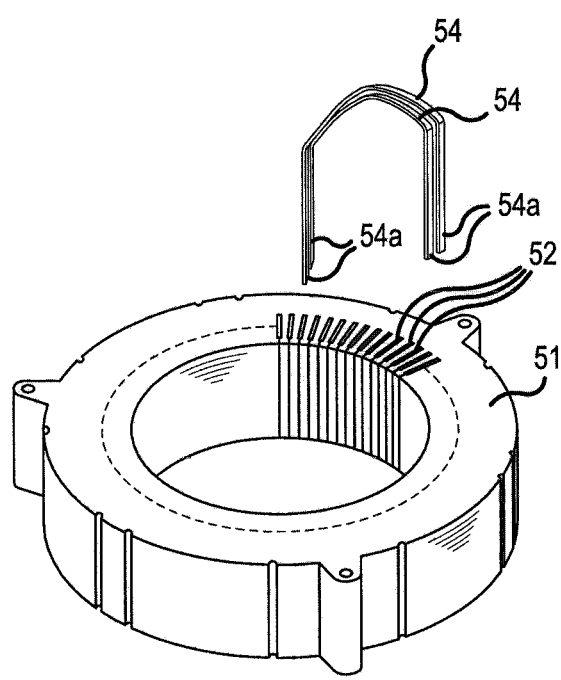
FIG. 6 is a schematic exploded perspective view showing a preferable embodiment of the stator to be used in the electrical or electronic equipment of the present invention.

The electrical or electronic equipment of the present invention formed by using the coil of the present invention, is not particularly limited, and examples of one preferable embodiment of such electrical or electronic equipment include: a rotating electric machine equipped with a stator 50 as shown in FIG. 5 (in particular, driving motors of HV and EV). This rotating electric machine can be made in the same constitution as the conventional one, except for equipment of the stator 50.

The stator 50 can be made in the same constitution as the conventional one, except for its wire segment 54 being formed by the insulated wire of the present invention. Specifically, the stator 50 has a stator core 51, and a coil 53 in which, as shown in such as FIG. 5, wire segments 54 formed of the insulated wire of the present invention having the constitution as shown in any of FIGS. 1 to 4, are incorporated in a slot 52 of the stator core 51 and open ends 54a of the wire segments 54 are electrically connected. In the case where an insulated wire having the configuration illustrated in FIG. 2 or FIG. 4 is used, this coil 53 is in the solidified state such that the adhesive layer on the outer periphery of the insulating paper and the slot 52 is fixed. Herein, the wire segment 54 may be incorporated in the slot 52 with one segment. However, it is preferable that as shown in FIG. 6, two segments are incorporated in a pair. In this stator 50, the coil 53 formed by alternately connecting the open ends 54a that are two ends of the wire segments 54 which have been subjected to bending processing as described above, is incorporated in the slot 52 of the stator core 51. In this time, the wire segment 54 may be incorporated in the slot 52 after connecting the open ends 54a thereof. Alternatively, after incorporating the wire segments 54 in the slot 52, the open ends 54a of the wire segments 54 may be subjected to bending processing, thereby to connect them.

In the insulated wire of the present invention, the use of the conductor having a rectangular cross-sectional shape allows, for example, enhancement in a ratio (space factor) of the cross-sectional area of the conductor to the slot cross-sectional area of the stator core, whereby properties of the electrical or electronic equipment can be improved.

The present invention will be described in more detail based on examples given below, but the invention is not meant to be limited by these.

EXAMPLES

EXAMPLES, COMPARATIVE EXAMPLES

Production Example 1

The insulated wire of Example 7 having the constitution as shown in FIG. 4, was produced.

—Conductor 41—

As a conductor 41, use was made of a rectangular conductor having rectangular cross-section (long side 3.2 mm×short side 2.4 mm, curvature radius of chamfered edge at four corners r=0.3 mm) (copper having an oxygen content of 15 ppm).

—Insulated Layer 42—

A polyamideimide (PAI) varnish (trade name: HI406, manufactured by Hitachi Chemical) was coated on a surface of the conductor 41, with using a die having a similarity shape of the shape of cross-sectional shape of the conductor 41, followed by passing through a 8m-long baking furnace controlled at 550° C. in-furnace temperature at the speed of 15 seconds passing time. This step of coating and baking was repeated 21 times, to thereby form the insulated layer 42, cured, and composed of PAI (the insulated layer (A) in the tables below) having a thickness of 60 μm.

—Insulated Layer 43—

As a screw of the extruder, use was made of the screw specified by: 30 mm full flight; LID=20; and compression ratio 3. As the material, use was made of polyetheretherketome (PEEK) (manufactured by Solvay Specialty Polymers, trade name: KITASPIRE KT-820, relative permittivity: 3.1). The extrusion temperature conditions were set as follows.

(Extrusion Temperature Conditions)

C1: 300° C.
C2: 380° C.
C3: 380° C.
H: 390° C.
D: 400° C.

"C1, C2, and C3" indicate cylinder temperatures in the extruder, and respectively indicate 3-zone temperatures of the C1, C2, and C3 in the order from the resin-casting section. "H" indicates a temperature of the head section, and "D" indicates a temperature of the die section. After extrusion-covering of PEEK with using the extrusion die, water cooling was performed at 10 second intervals, thereby to form a 60 μm-thick insulated layer 43 on the outer side of the insulated layer 42 (the insulated layer (B) in the tables below).

Adhesive Layer 44—

A polyetherimide (PEI) resin (trade name: ULTEM1000, manufactured by SABIC) was dissolved into NMP to prepare a varnish, which varnish was coated on a surface of the insulated layer 43, with using a die having a similarity shape of the shape of cross-sectional shape of the conductor 41, followed by passing through a 8m-long baking furnace controlled at 550° C. in-furnace temperature at the speed of 15 seconds passing time. This step of coating and baking was repeated 3 times, to thereby form the adhesive layer 44, which was composed of PEI (the adhesive layer (A) in the tables below) having a thickness of 10 μm.

—Insulating Paper 46—

An insulating paper 46 (layer formed from an insulating paper) was formed on the surface of the adhesive layer 44, by winding a plurality of layers of an insulating paper produced by covering both surfaces of a polyethylene naphthalate (PEN) film with a nonwoven fabric of aramid fibers (manufactured by DuPont, trade name: NOMEX, thickness: 0.3 mm) into a helical form around the direction of wiring as the axis, using a paper rolling facility, while implementing wiring of the insulated wire produced as described above.

—Adhesive Layer 47—

The insulated wire having the insulating paper 46 formed thereon was cut into a predetermined length, and the insulated wires thus cut were mounted in a spray-coating apparatus as a group of five wires. A varnish produced by dissolving a polyester elastomer resin (trade name: Hytrel2751, manufactured by Du Pont-Toray Co., Ltd.) into NMP, which varnish was coated by one reciprocating movement at a speed of 90 mm/sec, followed by drying at 200° C. for 15 minutes. Thus, an adhesive layer 47 was formed (the adhesive layer (B) in the tables below) having a thickness of 10 μm and formed from the polyester elastomer.

Production Examples 2 to 17

The insulated wires of Examples 1 to 6 and 8 to 12, and Comparative Examples 1 to 5, as shown in the tables below, were produced in the same manner as in Production Example 1 (the insulated wire of Example 7), except that the kind of resin to form each layer and the layer thickness were changed to those shown in the tables below.

Herein, the symbol "-" in the tables below means that no layer or no insulating paper was provided, or the like.

<Measurement and Evaluation>

—Tensile Modulus at 250° C. of Resin that Constitutes Adhesive Layer—

For each of the thermoplastic resins to be used in the adhesive layers (A) and (B) described in the tables below, a dumbbell-shaped specimen having a thickness of 1.6 mm (ASTM D 638) was prepared, and the tensile modulus was measured using a dynamic viscoelasticity analyzer, DMA8000 (trade name, manufactured by Perkin Elmer Japan Co., Ltd.). The tensile modulus was measured in the tensile mode while the temperature was increased from 50° C. to 270° C. at a rate of temperature increase of 10° C./min at 1 Hz, and thus the tensile modulus at 250° C. was obtained.

—Fixing Strength in High Temperature Atmosphere (200° C.) (High-Temperature Fixing Strength)—

Measurement of fixing strength was carried out using two pieces (two pieces each for the respective Examples and Comparative Examples) of a wire having the layer configuration before forming the insulating paper in the Production Example described above. An insulating paper cut into a strip was interposed between two pieces of a wire having the layer configuration before forming the insulating paper, and the surfaces that form the longer sides in the cross-section were superposed, with the insulating paper being interposed therebetween, and adhered such that the superposed length would be 200 mm. The resultant assembly was subjected to a heating treatment for 10 minutes at 280° C., and thus the entire adhered surfaces were fixed. This wire was placed in a constant-temperature chamber-attached tensile testing machine (manufactured by Shimadzu Corporation, trade name: AUTOGRAPH AGS-J, constant-chamber temperature: 200° C.), and the two ends of the superposed wires were pulled in opposite directions from each other at a tensile rate of 50 mm/min. The strength required for breaking the fixed state of the two wires was designated as the fixing strength, and the fixing strength was evaluated according to the following criteria. In this test, the evaluation was carried out such that a grade of "B" or higher is an acceptable level, while grade "A" is an especially excellent level.

The fixing strength was 2.0 MPa or higher : A

The fixing strength was 0.5 MPa or higher and lower than 2.0 MPa: B

The fixing strength was lower than 0.5 MPa: C

—Electrical Characteristics (Partial Discharge Initiation Voltage (PDIV)) Test—

For the measurement of the partial discharge initiation voltage of each of the insulated wires thus produced, use was made of: a partial discharge testing machine, "trade name: KPD2050" (trade name, manufactured by Kikusui Electronics Corp.).

For each of the insulated wires, a test specimen was produced by adhering the flat surfaces of two insulated wires over a length of 150 mm without any voids therebetween. An electrode was connected between the two conductors of this test specimen, and the voltage was continuously increased while an alternating current voltage at 50 Hz was applied thereto at a temperature of 25° C. The voltage at the time point where a partial discharge of 10 pC occurred was read out as the peak voltage (Vp). Here, the term "flat surface" refers to a surface in which the longer side (side along the horizontal direction in FIGS. 1 to 4) is continuously formed in the axial direction, in the cross-sectional shape of a rectangular-shaped insulated wire. Therefore, the test specimen was in a state in which, for example, another insulated wire 2 was superposed on or underneath the insulated wire 2 illustrated in FIG. 2.

The case where the peak voltage was 1,000 (Vp) or higher, is rated to as "A"; the case where the peak voltage was 700 (Vp) or higher and lower than 1,000 (Vp), is rated to as "B"; and the case where the peak voltage was lower than 700 (Vp), is rated to as "C". In this test, the evaluation was carried out such that a grade of "B" or higher is an acceptable level, while grade "A" is an especially excellent level.

—Bending Workability Test (Adhesiveness Test)—

The adhesiveness between the adhesive layer (A) and the insulating paper (the layer formed from the insulating paper) in any of the insulated wires was evaluated by the following bending workability test.

A test specimen having a length of 300 mm was cut out from each of the insulated wires thus produced. A cut (incision) having a depth of about 5 μm and a length of 2 μm was inserted into the insulating paper on an edge surface of this specimen respectively in two directions, namely, the longitudinal direction and the perpendicular direction, from the outer peripheral side of the insulating paper using a tool for exclusive use (at this time, the insulating paper and the adhesive layer (A) were adhered and were not detached). Here, in regard to the form in which the insulated wire had the adhesive layer (B), an incision was inserted from the outer peripheral side of the adhesive layer (B) toward the insulating paper, and thus a scratch was inserted into the insulating paper. Furthermore, the term "edge surface" means a surface in which the shorter side (the thickness, the side along the vertical direction in FIGS. 1 to 4) in the cross-sectional shape of the rectangular-shaped insulated wire is formed continuously in the axial direction. Therefore, the scratch is provided, for example, in any one lateral surface between the left-hand side surface and the right-hand side surface of the insulated wire 4 illustrated in FIG. 4.

This scratch was used as the vertex, and the specimen was bent 180° (U-shape) around an axis of an iron core having a diameter of 1.0 mm. The resultant state was maintained for 5 minutes. The progress of detachment between the adhesive layer (A) and the insulating paper occurring around the vertex of the specimen was observed with the naked eye.

In this test, the case where none of the scratches formed in the insulating paper or in the insulating paper through the adhesive layer (B) was expanded, and the insulating paper was not detached from the adhesive layer (A), was designated as "acceptable". The case where at least one of the scratches formed in the insulating paper or in the insulating paper through the adhesive layer (B) was expanded, and the entirety of the insulating paper was detached from the adhesive layer (A), was designated as "unacceptable". In the following tables, the acceptable level is described as "A", and the unacceptable level is described as "C".

The above results are collectively shown in the following tables. The details of the resins described in the tables are as follows:

PAI: polyamideimide (trade name: H1406, manufactured by Hitachi Chemical Co., Ltd., varnish)

PI: polyimide (trade name: U IMIDE, manufactured by Unitika Ltd., varnish)

PEst: polyester (trade name: Neoheat 8242, manufactured by Toutoku Toryo Co., Ltd., varnish)

PEEK: polyetheretherketone (trade name: KITA SPIRE KT-820, manufactured by Solvay Specialty Polymers)

PPS: polyphenylene sulfide (trade name: DICPPS FX-2100, manufactured by DIC, the resultant layer was formed of by extrusion-covering, after melting the resin)

PES: polyethersulfone (trade name: SUMIKAEXCEL4800G, manufactured by Sumitomo Chemical Company, the varnish was obtained by utilizing NMP when using)

PEI: polyetherimide (trade name: ULTEM1000, manufactured by SABIC, the varnish was obtained by utilizing NMP when using)

PPSU: polyphenylsulfone (trade name: Radel R5800, manufactured by Solvay Specialty Polymers, the varnish was obtained by utilizing NMP when using)

PET: polyethylene terephthalate (trade name: TR8550, manufactured by TEIJIN Ltd., the resultant layer was formed of by extrusion-covering, after melting the resin)

Epoxy-based resin: bisphenol A-type epoxy-based resin (trade name: 1004, manufactured by Mitsubishi Chemical Corporation, the varnish was obtained by utilizing MEK when using)

Polyester elastomer: trade name: PELPRENE E450B, manufactured by TOYOBO Co., Ltd., the varnish was obtained by utilizing NMP when using Polyamide elastomer: trade name: Pebax 2533SP01, manufactured by ARKEMA Japan, the varnish was obtained by utilizing NMP when using PSU: polysulfone (trade name: Udel P3703, manufactured by Solvay Specialty Polymers, the varnish was obtained by utilizing NMP when using)

PEI+PAI: PEI 80 mass parts and PAI 20mass parts were mixed

TABLE 1

|  |  | Examples | | | | | | | | | | | |
|---|---|---|---|---|---|---|---|---|---|---|---|---|---|
|  |  | 1 | 2 | 3 | 4 | 5 | 6 | 7 | 8 | 9 | 10 | 11 | 12 |
| Insulating layer (A) | Resin | PAI | PAI | PI | PI | PEst | PAI | PAI | PI | PAI | PAI | PAI | PAI |
|  | Thickness | 60 | 100 | 40 | 120 | 20 | 60 | 60 | 40 | 60 | 60 | 60 | 50 |
| Insulating layer (B) | Resin | — | — | — | PEEK | PEEK | PPS | PEEK | PPS | PPS | PEEK | PET | PPS |
|  | Thickness | — | — | — | 50 | 200 | 150 | 60 | 120 | 120 | 150 | 70 | 130 |
| Adhesive layer (A) | Resin | PES | PPSU | PEI | PPSU | PEI | PPSU | PEI | PPSU | PPSU | PEI | PEI | PEI |
|  | Elastic modulus (×10$^7$ Pa) | 9.7 | 3.9 | 2.5 | 3.9 | 2.5 | 3.9 | 2.5 | 3.9 | 3.9 | 2.5 | 2.5 | 2.5 |
|  | m.p. | None | None | None | None | None | None | None | None | None | None | None | None |
|  | Thickness | 5 | 15 | 50 | 20 | 2 | 15 | 10 | 15 | 20 | 2 | 10 | 50 |
| Insulating paper |  | Present | Present | Present | Present | Present | Present | Present | Present | Present | Present | Present | Present |
| Adhesive layer (B) | Resin | — | — | — | — | — | — | Polyester elastomer | Polyamide elastomer | PSU | PEI 80 parts + PAI 20 parts | PEI | PET |
|  | Elastic modulus (×10$^7$ Pa) | — | — | — | — | — | — | 1.8 | 1.5 | 0.9 | 2.8 | 2.5 | 10.3 |
|  | Thickness | — | — | — | — | — | — | 10 | 5 | 10 | 25 | 10 | 30 |
| High-temperature fixing strength |  | A | A | A | A | A | A | A | A | A | A | A | A |

TABLE 1-continued

| | | | | | | | | | | | | | |
|---|---|---|---|---|---|---|---|---|---|---|---|---|---|
| PDIV | | B | A | A | A | A | A | A | A | A | A | A | A |
| Bending workability | | A | A | A | A | A | A | A | A | A | A | A | A |

| | | Comparative Examples | | | | |
|---|---|---|---|---|---|---|
| | | 1 | 2 | 3 | 4 | 5 |
| Insulating layer (A) | Resin | PAI | PAI | PAI | PAI | PAI |
| | Thickness | 60 | 60 | 60 | 60 | 60 |
| Insulating layer (B) | Resin | — | — | PEEK | PEEK | PEEK |
| | Thickness | — | — | 50 | 60 | 60 |
| Adhesive layer (A) | Resin | — | — | — | Epoxy | PET |
| | Elastic modulus ($\times 10^7$ Pa) | — | — | — | 0.2 | 10.3 |
| | m.p. | — | — | — | None | Present |
| | Thickness | — | — | — | 10 | 50 |
| Insulating paper | | Present | Present | Present | Present | Present |
| Adhesive layer (B) | Resin | — | — | — | — | — |
| | Elastic modulus ($\times 10^7$ Pa) | — | — | — | — | — |
| | Thickness | — | — | — | — | — |
| High-temperature fixing strength | | C | C | C | C | A |
| PDIV | | B | B | A | A | A |
| Bending workability | | — | C | C | A | C |

\<Notes for the Tables Above\>

Insulating layer (A): The insulating layer formed on the outer periphery of the conductor Insulating layer (B): The insulating layer formed on the outer periphery of the insulating layer (A)

Adhesive layer (A): The adhesive layer formed on the outer periphery of the insulating layer (A) or the insulating layer (B)

Adhesive layer (B): The adhesive layer formed on the outer periphery of the insulating paper Thickness: Unit is in terms of μm Elastic modulus: Tensile modulus at 250° C.

As is obvious from the tables above, it can be seen that the insulated wires of Examples 1 to 12, which satisfies the specifications of the present invention, were such that the insulating paper was fixed to the insulating layer with strong fixing strength at 200° C., and the insulated wires have high partial discharge initiation voltages (PDIV) at the bent portion without any additional insulating layer provided thereon, and have excellent bending workability and heat resistance. It can be seen that since the insulated wires have excellent bending workability, slippage of the insulating paper does not occur when the insulated wire is inserted into a slot of a stator core.

Furthermore, since the insulated wires of Examples 7 to 12 have an adhesive layer on the outer periphery of the insulating paper, can be omitted a process of inserting the insulated wire into a slot of a stator core, then introducing a varnish of a resin that constitutes the adhesive layer (B) into the slot, and immobilizing the insulated wire and the slot.

The insulated wire of Comparative Example 1 did not have the adhesive layer (A) and the insulating paper. This insulated wire of Comparative Example 1 had unacceptable fixing strength at 200° C. Meanwhile, since the insulated wire did not have the insulating paper, the bending workability test was not carried out. The insulated wires of Comparative Examples 2 and 3 did not have the adhesive layer (A). The insulated wires of Comparative Examples 2 and 3 had unacceptable fixing strength at 200° C. and unacceptable bending workability. The insulated wire of Comparative Example 4 was such that the tensile modulus at 250° C. of the resin that constituted the adhesive layer (A) was outside of the defined range of the present invention. The insulated wire of Comparative Example 4 had unacceptable fixing strength at 200° C. The insulated wire of Comparative Example 5 was such that the resin that constituted the adhesive layer (A) had a melting point. The insulated wire of Comparative Example 5 had unacceptable bending workability.

Having described our invention as related to the present embodiments, it is our intention that the invention not be limited by any of the details of the description, unless otherwise specified, but rather be construed broadly within its spirit and scope as set out in the accompanying claims.

This application claims priority based on Patent Application No. 2016-040748 filed in Japan on Mar. 3, 2016, which is entirely herein incorporated by reference.

REFERENCE SIGNS LIST 1, 2, 3, 4 insulated wire
11, 21, 31, 41 conductor
12, 22, 32, 42 insulated layer
33, 43 insulated layer
13, 23, 34, 44 adhesive layer
14, 24, 35, 45 resin covering layer
15, 25, 36, 46 insulating paper
26, 47 adhesive layer
50 stator
51 stator core
52 slot
53 coil
54 wire segment
54a open end

The invention claimed is:

1. An insulated wire, having:
an insulating layer on the outer periphery of a conductor having a rectangular cross-section;
an adhesive layer on the outer periphery of the insulating layer; and
an insulating paper on the outer periphery of the adhesive layer, wherein the adhesive layer has a thickness of 2 to 50 μm, and wherein a resin constituting the adhesive layer does not have a melting point and has a tensile modulus at 250° C. of $0.9 \times 10^7$ to $1.2 \times 10^8$ Pa.

2. The insulated wire as claimed in claim 1, wherein the adhesive layer contains, as the resin constituting the adhesive layer, at least one resin selected from the group consisting of polyethersulfone, polyphenylsulfone, and polyetherimide.

3. The insulated wire as claimed in claim 1, further having an adhesive layer on the outer periphery of the insulating paper.

4. A coil, comprising the insulated wire as claimed in claim 1.

5. An electrical or electronic equipment, having the coil as claimed in claim 4.

\* \* \* \* \*